(Model.)

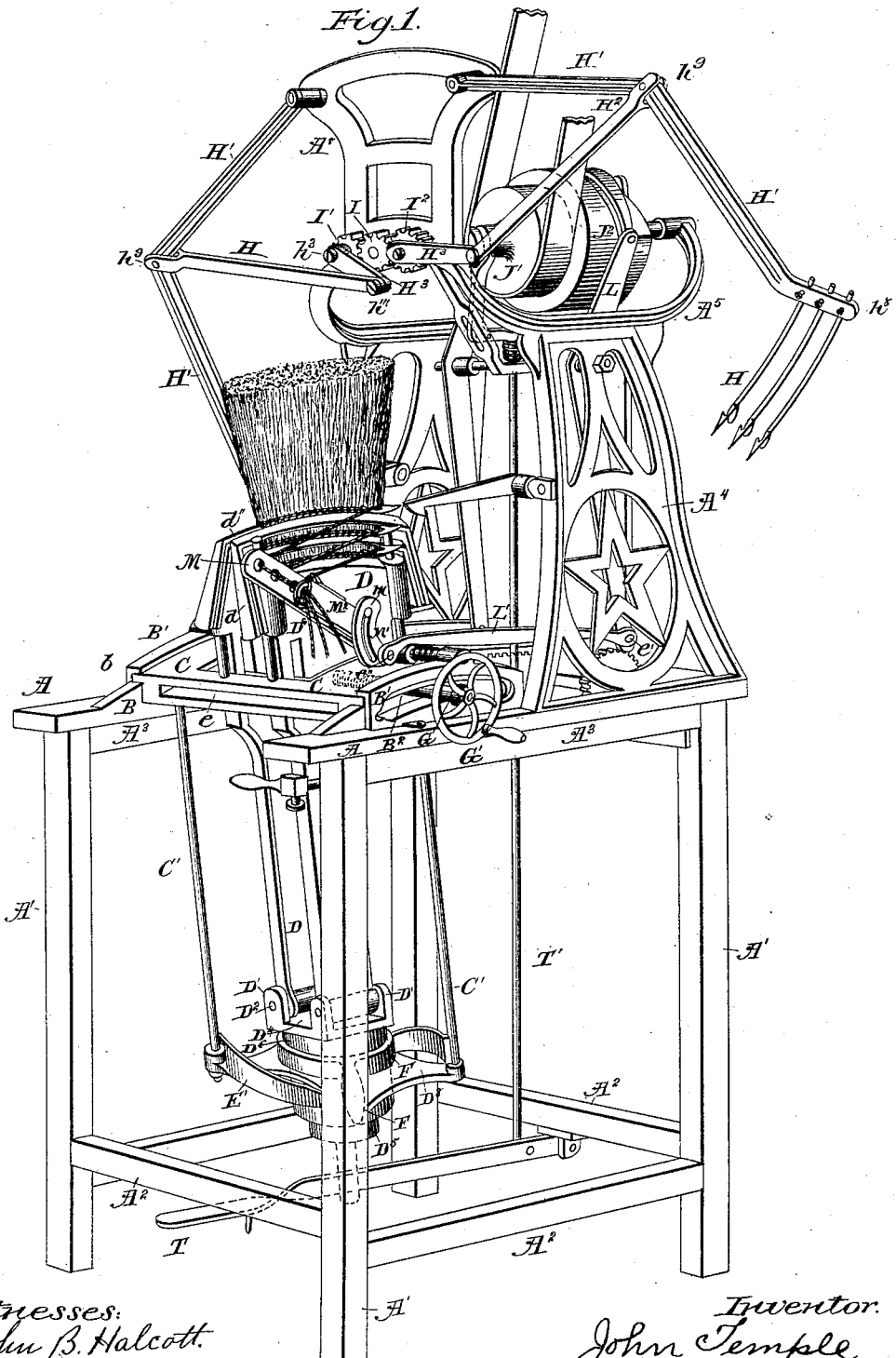

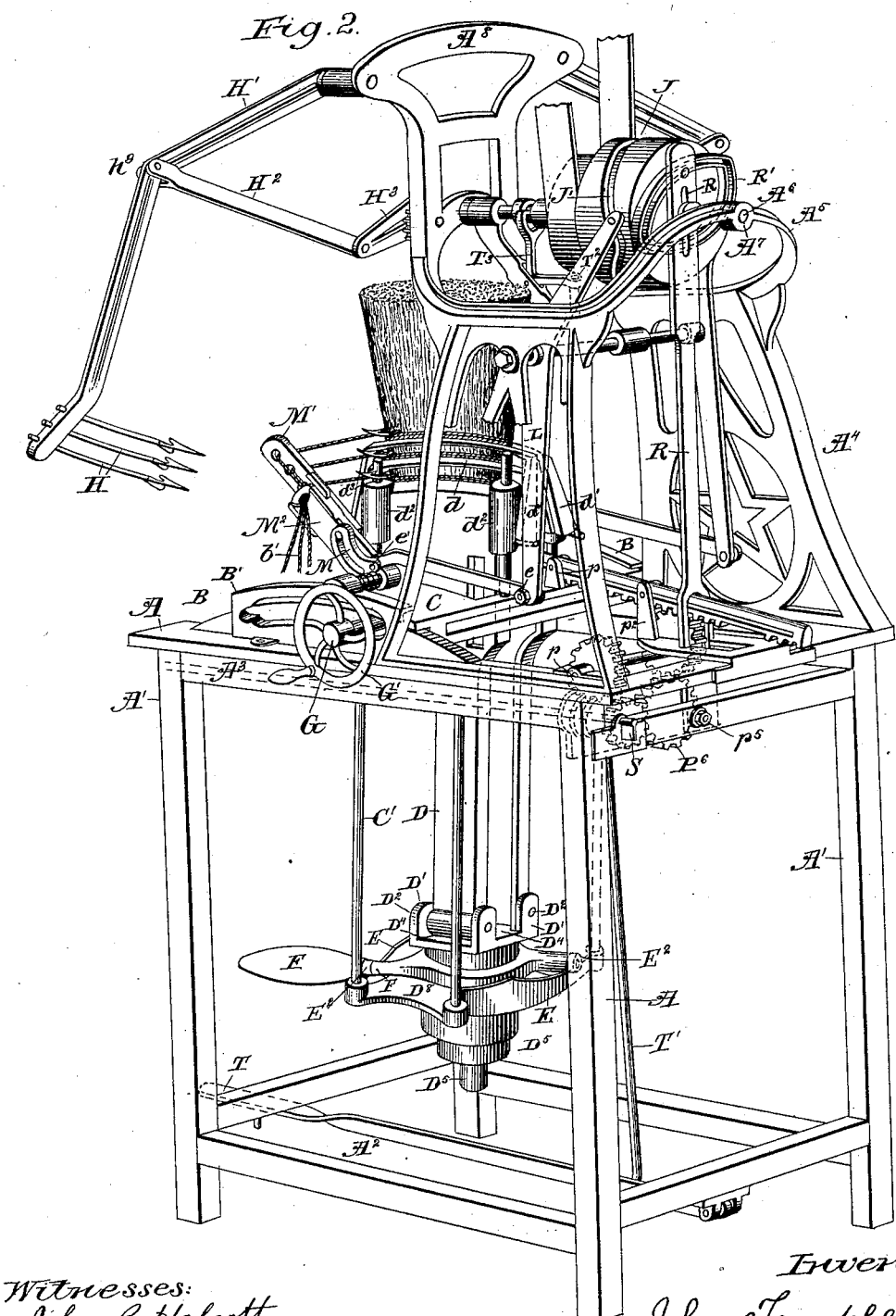

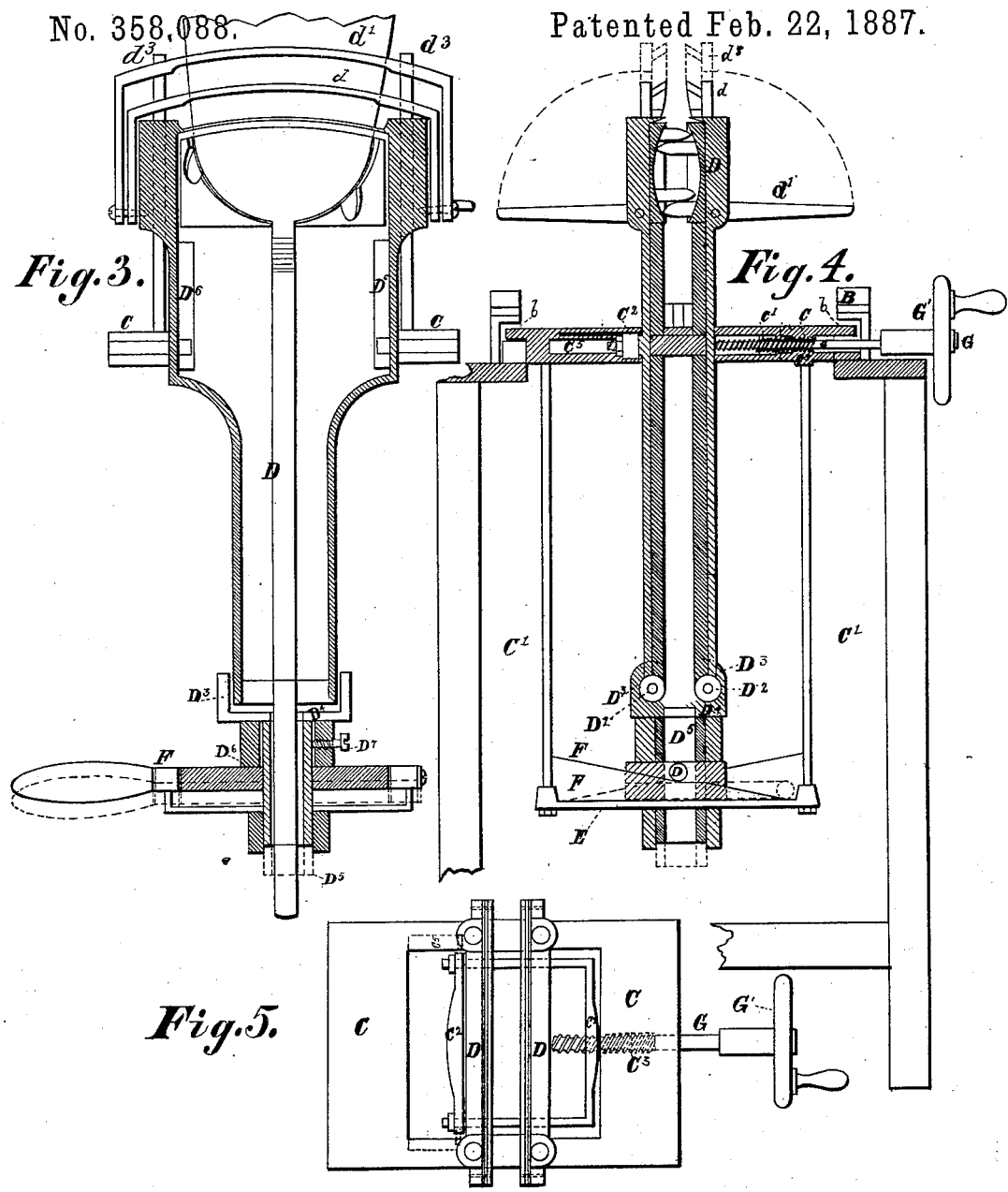

J. TEMPLE.
MACHINERY FOR SEWING BROOMS.

No. 358,088. Patented Feb. 22, 1887.

6 Sheets—Sheet 4.

Witnesses
Walter E. Ward.
Seymour N. Harris.

Inventor
John Temple
per Frederick W. Cameron
Attorney.

(Model.) 6 Sheets—Sheet 5.

J. TEMPLE.
MACHINERY FOR SEWING BROOMS.

No. 358,088. Patented Feb. 22, 1887.

Witnesses
Walter E. Ward.
Seymour N. Harris.

Inventor
John Temple
per
Frederick W. Cameron
Attorney

N. PETERS, Photo-Lithographer, Washington, D. C.

(Model.) 6 Sheets—Sheet 6.
J. TEMPLE.
MACHINERY FOR SEWING BROOMS.
No. 358,088. Patented Feb. 22, 1887.
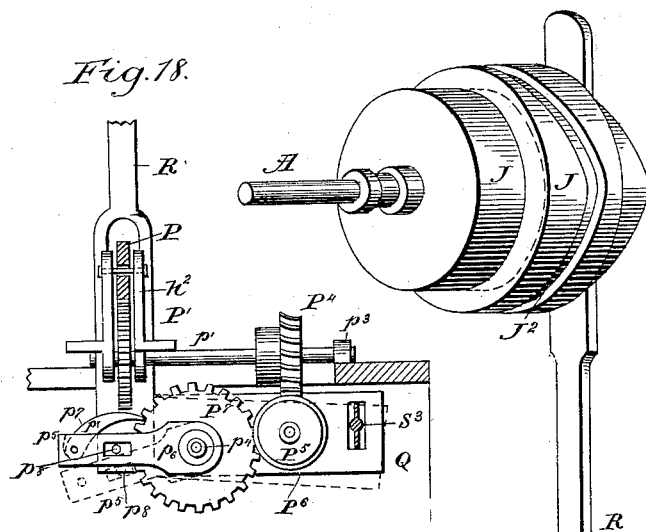
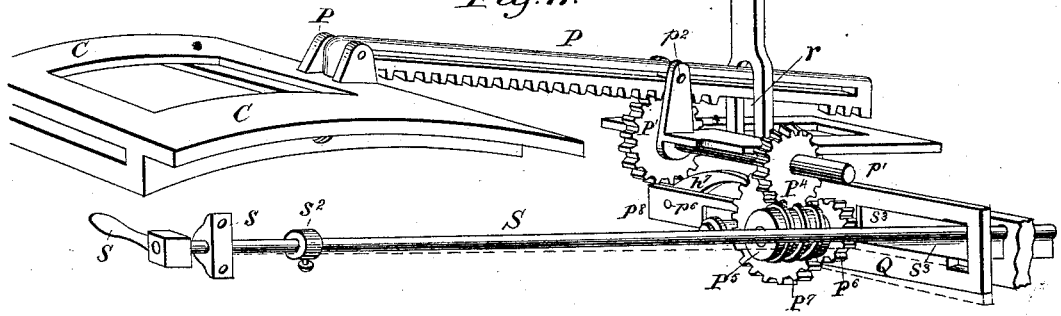
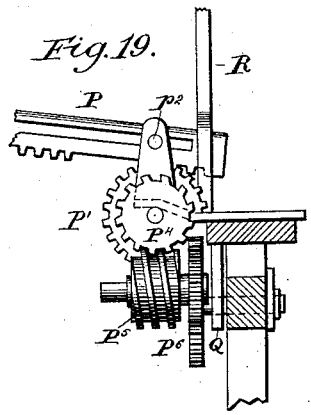
Witnesses:
John B. Halcott.
Walter E. Ward
Inventor:
John Temple
per Frederick W. Cameron,
His Attorney in Fact.

UNITED STATES PATENT OFFICE.

JOHN TEMPLE, OF ALBANY, NEW YORK.

MACHINERY FOR SEWING BROOMS.

SPECIFICATION forming part of Letters Patent No. 358,088, dated February 22, 1887.

Application filed July 21, 1885. Serial No. 172,257. (Model.)

*To all whom it may concern:*

Be it known that I, JOHN TEMPLE, residing at the city and county of Albany, and State of New York, have invented a new and useful Improvement in Machinery for Sewing Brooms and Like Articles, of which the following is a specification.

Figure 6:
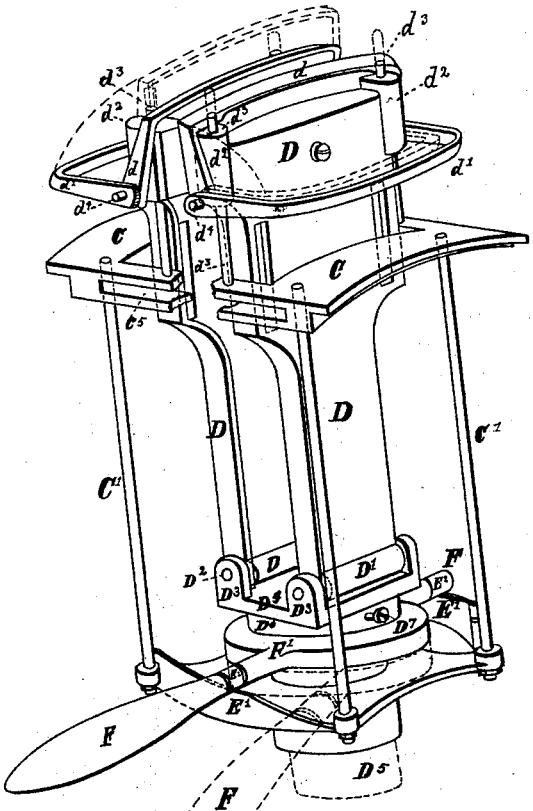
Figure 7:
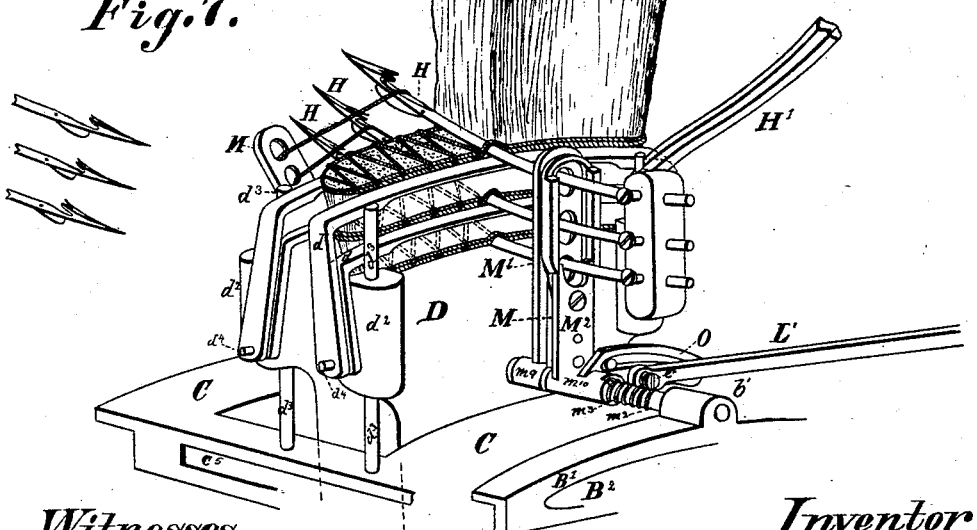
Figure 8:
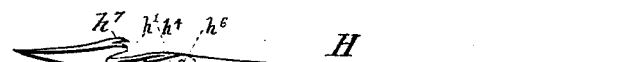
Figure 9:
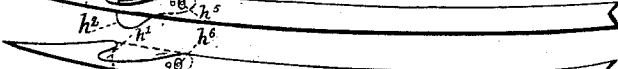
Figure 10:
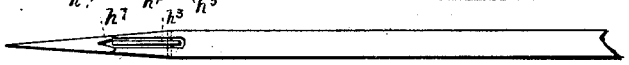
Figure 15:
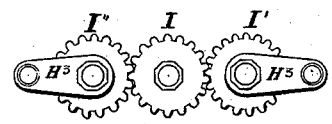
Figure 11:
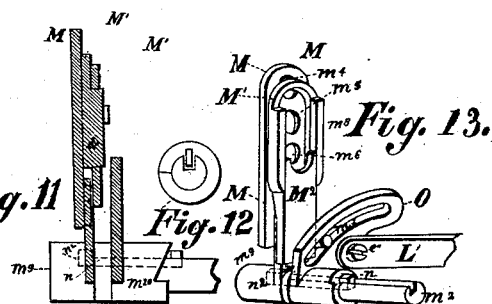
Figure 12:
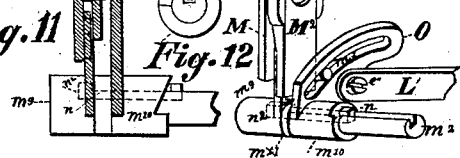
Figure 16:
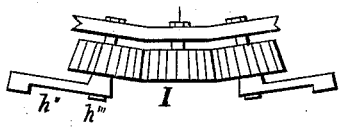
Figure 14:
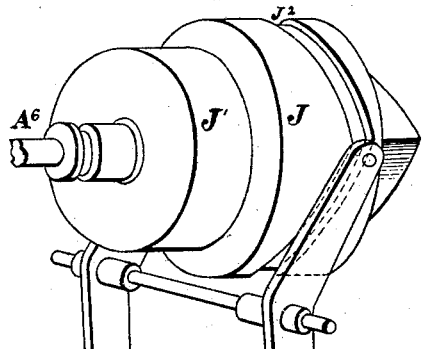
Figure 13:
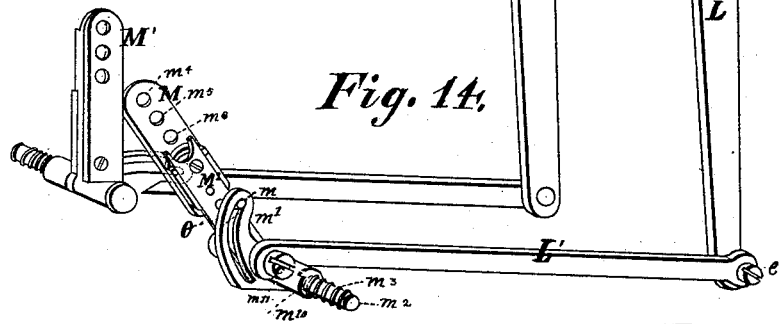

In the accompanying drawings, forming part of the specification, Figure 1, Sheet 1, is a front perspective view of a machine embodying my invention, showing the broom in the vise and in position of receiving the last stitch. Fig. 2, Sheet 2, is a rear perspective view of the machine, showing the broom in the vise in the position of receiving the first stitch. Fig. 3, Sheet 3, is a view in elevation showing, on an enlarged scale, the inside of one of the jaws of the broom-holding vise. Fig. 4 is a transverse section through both jaws of the vise. Fig. 5 is a plan of the vise, link, vise-carrying frame, and screw. Fig. 6, Sheet 4, is a perspective view of the vise, showing manner of raising and lowering same. Fig. 7 shows in perspective a detached portion of the mechanism most directly operative in forming the stitch. Fig. 8, Sheet 5, is a longitudinal sectional view of one of the needles. Figs. 9 and 10 are views illustrative of the construction of the needles. Fig. 11 is a view in elevation of the threading and tension device. Fig. 12 is a plan of the washer, a part of the threading mechanism. Figs. 13 and 14 are perspective views of threading and tension device, showing mode of operation. Fig. 15 is a plan, and Fig. 16 an elevation, view of the three cog-wheels to which the needle-arms are attached and geared. Fig. 17, Sheet 6, is an outline perspective view, to an enlarged scale, illustrative of the mechanism employed for giving feed motion to the broom-holding vise, and also for throwing the same out of gear. Fig. 18 is a front, and Fig. 19 a side view, in elevation, of the mechanism employed by me for giving feed motion to the broom-holding vise.

Similar letters refer to similar parts throughout the several views.

My invention relates to the construction and operation of machines for sewing brooms and like articles.

My invention has for its object the production of a simple, durable, and effective machine for sewing brooms and like articles, said machine being adapted to sew one or more seams at the same time and to make a stitch substantially that of the hand-sewed broom, and to work rapidly and with the expenditure of little power.

In the drawings, A represents the bed of the machine, which is supported by uprights or legs A', constructed of wood or metal, connected near the bottom and top by braces $A^2$ and $A^3$, as shown in the drawings; or it may be supported in any other suitable manner.

Upon the bed A rests the curved disk or track B, upon which slides the vise-carrying frame C, causing the seam on the broom to be sewed in a curved form.

The disk or track B on the side of the machine nearest the crank-wheel G' is provided with a slot, $B^2$, through which the vise-screw G passes, allowing the screw G to move laterally with the movement of the vise. Attached to the outer sides of said disks or tracks B B are metallic curved frames B', having their upper edges turned over and forming, with the tops of the tracks B B, grooves $b\ b$, through which grooves the vise-carrying frame C moves. The metallic frames B B' have attached to their upper surfaces bosses $b'\ b'$, in which the threader-shafts $m^2$ are secured. The bosses $b'\ b'$ act also as an abutting bed for the spring $m^3$. The frame placed over the disk or track B nearest the crank-wheel G' has a slot corresponding to the slot $B^2$ in the track B, through which the screw G passes and moves.

The bed A has attached to it a frame consisting of uprights $A^4$, securely braced in a suitable manner and connected at the top by braces supporting a shaft, $A^6$, carrying the cam-wheel J and friction-pulley J'. The braces may be constructed of wood or metal, and may be curved in form, as shown by $A^5$ in the drawings, or in any suitable manner. The shaft $A^6$ passes through the braces or support $A^5$ in the front of the machine, and has a beveled cog-wheel securely attached thereto. To the front of the braces $A^5$ is an upright frame, $A^8$, supporting the needle-arms.

I will now proceed to describe the broom-holding vise and the means for operating it.

The vise is composed of two jaws, D, of suitable material, extending below the bed A, and each secured by a hinge to the plate D⁴, allowing the upper ends of the jaws to be separated or closed, as desired. The vise is closed by means of a screw, G, which passes through the slot B² of the frame B' and B, and through the vise-carrying frame C, and through the link C². The screw G has attached to the end which extends beyond the bed of the machine the crank-wheel G'. The half of the threaded portion of the screw G nearest the point of the screw is smaller in diameter than the other half, and the part of the screw having the smaller diameter has a right screw-thread cut onto it, while the remainder of the threaded portion of the screw is cut with a left screw-thread. That part of the screw G which moves in the slot B' with the movement of the vise is unthreaded, having a smooth surface. The part of the screw G having the smaller diameter passes through the vise-carrying frame without meshing with the threaded opening c³ in said frame C, and passes into the link C², which is threaded and with which it meshes. The threaded part of the screw G, having the greater diameter threaded with the single thread, meshes with the thread of the threaded opening c³, as shown in Figs. 4 and 5. By means of this construction of the screw G and its attachments, when the screw G is placed in the vise-carrying frame C and link C², with its point resting against the jaw D of the vise in readiness for operation, and the screw G is turned, the link C², and therefore the jaw D of the vise farthest from the crank-wheel G', is drawn toward the head of the screw. At the same time the point of the screw pushes with equal force against the other jaw D of the vise, tending to close the vise. The result obtained by this manner of moving both jaws of the vise equally is that of keeping the center line of the broom-holding vise common with the center line of the machine, which is necessary for the successful working of the needles.

The link C², made of suitable material, passes through the slots D⁶ of the vise, and is in contact with the jaw D of the vise farthest from the crank-wheel G', and is provided with two screws or pins, c⁴, at the ends farthest from the screw-head G', which said pins or screws c⁴ pass into the slot c⁵ of the vise-carrying frame C, by which means the link C² is supported and moves. The link C² may be supported in any other suitable manner. The end of the link C² nearest the screw-head G' is supported and held in position by the screw G.

The plate D⁴, to which the vise-hinges D² are secured, has an aperture through its center to admit the passage of the broom-handle. Secured to the plate D⁴ is the sleeve D⁵, through which the broom-handle passes, and upon which an adjustable collar, D⁶, is placed for the purpose of lowering or raising the broom-holding vise from the bed A. This collar may be adjusted by means of a set-screw, D⁷, Fig. 6, or by other well-known means.

The lever F has a circular disk, F', with a circular aperture through which the sleeve D⁵ passes, each end extending beyond F', and provided with friction-rollers E² where the lever F comes in contact with the camway E'. The camway E' is attached to the plate D⁸ and forms a part thereof. The camway-plate D⁸ is connected to the vise-carrying frame C by cords or rods C'. The lever F, when moved along the camway E', raises or lowers the vise in its frame C.

At the upper end of each jaw D of the vise are two bosses, d² d², through which the pins or bolts d³ move freely. The lower ends of the pins or bolts d³ are in contact with the vise-carrying frame C in such a position that when the vise is raised to its highest point by the lever F on the camway E' the top of the pins or bolts d³ will be on a level with the top of the boss d², and when the vise is lowered in the vise-carrying frame C the pins or bolts d³ being in contact with the frame C, and the boss d² moving with the vise allows the tops of the pins or bolts d³ to project above the boss d² and to press against and hold in position the vise-clamps d and d'.

To the outer side of each boss d² is secured, by means of a screw or bolt, d⁴, the vise-clamps d and d'. The vise-clamp d' is longer and wider than the vise-clamp d and overlaps the vise-clamp d. The same screw, pin, or bolt d⁴ acts as an axis for each of the vise-clamps d and d' to move upon.

I will now proceed to describe my needle, its attachments, and mode of operation.

The needle H is made of steel, and is slightly curved upward to give, with the aid of the needle-arm H', the "overcast" stitch of the hand-sewed broom, each needle passing under a band on the side of entrance and projecting through the broom on its opposite side over the band. The eye h' of the needle H is closed by means of a tongue, h², passing through a slot, h³, of the needle and into a slot, h⁷, in the upper part of the eye of the needle. In the slot h³ the tongue h² moves freely, and is secured in said slot h³ by a pin or bolt, h⁴, which passes through the tongue h² near its end farthest from the eye of the needle. The tongue h² has an elongated slot, h⁵, through which the pin h⁶ passes, and limits the movement of the tongue h² on the pin h⁴. The tongue h² is rounded on its lower side and straight on its upper side, and its greatest width is equal to that of the width of the needle H at the eye, so that when the eye h' of the needle is closed there is formed an uninterrupted surface on both the upper and under sides of said needle H, in order that the needle may pass through the broom under and over the band, and when the rounded part of the tongue comes into contact with the vise-clamps d and d', as it does when passing into the broom, the eye will be closed, preventing obstruction.

My needle, working automatically, does away with the necessity of complicated contrivances for opening and closing the eye of the needle, and performs its function perfectly and without the use of extra power.

The needle-arm H' is flattened and squared at its lower end, $h^8$, and provided with one or more apertures for receiving and securing the blunt end of the needle or needles, and arranged at such an angle with reference to the needle and the broom to make the overcast stitch by giving the needles the requisite angle with the broom.

The needle-arm H' is properly bent or curved in the drawings in the shape of an obtuse angle, and movably secured to the upright frame $A^8$ by a sleeve and bolt, or an equivalent, said bolt making an angle with the upright frame $A^8$. At the angle $h^9$ of the arm H' the connecting-rod $H^2$ is attached. The connecting rod $H^2$ is attached at its end farthest from the arm H' to the crank $H^3$. The cranks $H^3$ are immovably attached to the hub of the beveled cog-wheels I' and $I^2$, respectively, by means of a key or bolt.

The cog-wheels I' and $I^2$ mesh with the cog I, which is attached to the shaft $A^6$. The cogs I' and $I^2$ each move freely on a stud attached to the head of the machine, and are so beveled and arranged in a curved position that the cranks $H^3$, attached to the connecting-rods $H^2$, will pass each other in the movement of the machine. This arrangement of the cogs I, I', and $I^2$ is shown in plan in Fig. 15 and in elevation in Fig. 16, and gives the needles an outward direction, and this arrangement of the cogs I, I', and $I^2$, in connection with the angle at which the needle-arm H' is attached to the head of the machine, causes the needles to enter the broom at an angle, the needles passing not only under and over the band, but also forward toward the front of the machine, making the W-stitch, as shown in Fig. 7.

By means of the connecting-rod $H^2$ and the crank $H^3$, the needle-arm H', and therefore the needles H, are thrown out at a distance from the vise on one side, while the needles on the opposite side are in the broom, as shown in Figs. 1 and 2. By this means the slack end of the threads are drawn through the threader and clear of the broom by the needle itself, without the aid of a separate device, which is necessary in some machines now in use for sewing brooms.

By my arrangement of the needles I can have one or more needles on each side of the broom at work at the same time, and can open and close the eye of the needles, and remove the slack end of the threads from the broom, and keep the threads separate by means of my threading and tension device, which I now proceed to describe.

The part of the threading and tension device most directly instrumental in threading the needles is composed of three pieces of metal, M, M', and $M^2$. M' moves freely on the shaft $m^2$ by means of a sleeve, $m^9$. The front part of the sleeve $m^9$ is provided with a slot, $n^2$, into which the gib or feather $n$ passes. M' is slotted from the sleeve $m^9$. M has three circular apertures, $m^4$, $m^5$, and $m^6$, through which the needles pass. There may be more or a less number of apertures in M, corresponding to the number of needles used. At the lower end and on the inside of M is arranged a projection, which moves freely in the slotted part of M', and which is attached to $M^2$ by means of a pin or screw. The face of M' is extended beyond the surface at $m^8$, forming a groove through which the binder $M^2$ freely moves. Between the sleeve $m^9$ and the cam-sleeve $m^{10}$ there is a washer, $m^{xi}$, of the same width of $M^2$. The washer is provided with a slot into which the gib or feather $n$ passes when withdrawn from the slot $n^2$ in the sleeve $m^9$.

The cam-shaped link O is movably attached to the shaft $m^3$ by means of a sleeve. The outer surface of said sleeve $m^{10}$ is cam-shaped in such a manner that the gib or feather $n$ is pressed against it at all times by a resilient contrivance, represented in the drawings by the spring $m^3$.

$M^2$ has attached to a stud a friction-roller working in the cam-shaped link O, by which means M and $M^2$ are raised perpendicularly and together with the movement of the cam-link O. The threads are held taut by the binder M' remaining stationary while the threader M is raised, the threads being pinched between the top of the binder M' and the lower part of $M^2$, as shown in Fig. 1, so that when the threader and binder is moved forward and downward the threads are drawn and held in their respective needles. The shaft $m^2$ is grooved in its upper surface to admit of the passage of the gib or feather $n$.

The cam-shaped link O is fastened to the connecting-rod L', the connecting-rod L' being attached to the lever L, which works by means of a friction roller or stud in the camway $J^2$ of the cam-wheel J. The camway $J^2$ is so constructed and formed that while connecting-rod L', connected to the cam-link O of one of the threaders, is pressing that threader forward and downward, thereby threading the needles, the threader on the opposite side of the machine is in an upright stationary position ready to receive the threads as the needles are withdrawn. By means of this mechanism, as the connecting-rod L' moves forward toward the front of the machine, the cam-link O forces upward the threader M and $M^2$, at the same time carrying the threads above the points of the needles. The cam-shaped sleeve $m^{10}$ of the cam-link O draws out the feather or gib $n$ from the slot in the sleeve $m^9$ into the washer $m^{xi}$, allowing the whole threading attachment to move forward and downward, carrying the threads into the needles and holding them in place, as shown in Figs. 1 and 2.

I will now proceed to describe the mechanism employed to give the feed motion to the broom-carrying vise.

Attached to the center of the rear part of the vise-carrying frame C, by a hinge, $p$, is the rack P, Fig. 17. The rack P has its lower surface notched except for a short distance near the end farthest from the vise. The notches on the rack P mesh with the cogs of the wheel P', which is connected with a shaft, $p'$, which shaft is supported by bearings $p^2$ to the rear part of the bed A. The bearings $p^2$ extend also above the wheel P' and hold a pin or bolt passing through the slot in the rack P, keeping the notches of the rack P meshed with the cogs of the wheel P' as the vise-carrying frame C moves in its curved path. The end of the shaft $p'$ farthest from the cog-wheel P' has a bearing, $p^3$, in the bed A of the machine. On the shaft $p'$, near the bearing $p^3$, a wheel, $P^4$, is attached, which meshes in the worm $P^5$. The worm $P^5$ is connected with a cog-wheel, $P^6$, revolving together on a shaft attached to the plate Q. The cog-wheel $P^6$ meshes with the ratchet-wheel $P^7$, which is attached to a collar, $p^4$, revolving on a shaft, $p^5$, attached to the rear of the frame of the machine. Attached to the stud $p^4$ is a link, $p^6$, carrying the pawl $p^7$ of the ratchet-wheel. Through a slot, $p^8$, of the link $p^6$ passes a screw or bolt, $p^9$, which is attached to the rod R. The rod R is extended through the bed A of the machine and contains a slot, $r'$, through which the rack P passes, and the rod R has at its upper end a friction-roller placed in the camway R' of the cam-wheel J, the rod R being slotted near its upper end to allow the passage of the shaft $A^6$, and is held in position in the camway R' by the adjustable collar. This mechanism is so arranged that as the camway R' in the cam-wheel is revolved by the revolution of the cam-wheel J the rod R is given an upward-and-downward motion, and the ratchet-wheel $P^7$, by means of the pawl $p^7$ and accompanying wheels $P^6$, worm $P^5$, cog-wheels $P^4$ and P', give the rack P, and therefore the vise-carrying frame C and broom-holding vise, an intermittent forward motion so arranged that the broom-holding vise will move forward after each withdrawal of the needles, but remaining stationary during the passage of the needles through the broom.

The rack P has a space unnotched near the end farthest from the vise, in order that the vise will stop its forward movement when the last stitch has been taken in the broom while the machine is in motion. Otherwise the needles might strike the broom-holding vise and be broken.

It is necessary that the feeding mechanism may be thrown out of gear instantaneously in order that the broom-holding vise may be drawn forward and backward in placing the broom in position for sewing. This I accomplish in the following manner: I arrange a rod or bar, S, under the bed A of the machine, extending from the front to the rear of the machine, and provided with a handle, S'. The rod S is secured by means of a sleeve, $s$, to the under part of the bed A. The adjustable collar $S^2$, to prevent the rod S from being drawn out of position in the rear, is attached to the rod S. The end of the rod S farthest from the handle S' is provided with an inclined plane or portion extending above and below the rod S. The end farthest from the end containing the point of the inclined portion passes through the plate Q, to which plate is attached the worm $P^5$ and cog-wheel $P^6$, and from thence the rod S passes into the slot $s^3$ in the bed of the machine, in such a manner that when the rod S is pushed into the slot $s^3$ in the position shown in full lines in Fig. 17 the plate Q is raised and the worm $P^5$ meshes with the wheel $P^4$ and the feeding device is in gear. When the rod S is withdrawn, it assumes the position shown by the dotted lines in Fig. 17. The plate Q and worm and wheel attached fall out of gear.

For the purpose of starting the machine in order to sew the broom, I have a treadle, T, attached to the rod T', having a screw, $T^2$, at its upper end attached to an elbow-lever, $T^3$, connected at the angle by a pin or bolt and at its opposite end to the friction-pulley J' in such a manner that by pressing on the treadle T with the foot the friction-pulley J' will be drawn into the cam-wheel J, and the machine will be in motion, the power being furnished by a belt attached to the friction-pulley J'. The same result may be obtained by having a loose and tight pulley and shifting the belt, or in any other well-known manner.

I obtain the movement for my whole machine from the cam-wheel J. The cam-wheel J has the cam-wheel $J^2$, which furnishes the movement for the threading and tension device. It also has the camway R', which furnishes the movement for the vise-carrying frame C. The pulley J also furnishes the movement to the shaft $A^6$, which, by means of the cog-wheels I, I', and $I^2$, moves the needles H, thus making a machine which will sew the three bands of a broom at the same time—a result which cannot be attained by any broom-sewing machine besides this that I am aware of—and made in so simple a manner, without the use of any complicated machinery, that an unskilled hand may run it.

To sew a broom in my machine, the broom-holding vise is drawn forward to the front of the machine. The vise-feeding mechanism is placed out of gear. The broom is placed into the vise, the vise being raised to its highest limit by means of the lever F and camway E'. The jaws D of the vise are then closed by means of the screw G. The first band is then wound around the broom, the end of the thread passed through the eye $m^6$ of the threader, the vise or band-clamp $d$ is raised and placed against the broom, the lever F moved half-way along the camway E', thereby lowering the vise, causing the pins or bolts $d^3$ to press against the vise-clamp $d$, and the vise is tightly closed by means of the screw G. The second band is then placed about the broom, the vise-clamp $d'$ is raised against the broom, the thread is placed through the eye $m^5$ of the threader, the lever F is moved to the lowest limit on the camway E', the vise is lowered, and the bolts or pins $d^3$ press against the vise-clamp $d'$, and the third band is placed about the broom and the thread passed through the eye $m^4$ of the threader. The broom-holding vise is then pushed back into position to receive the first stitch, as shown in Fig. 2. The feeding mechanism is then placed into gear by pushing in the rod S, the foot is pressed onto the treadle T, adjusting the friction-pulley $J'$ in contact with the cam-pulley J, and the machine is started. When the broom is sewed, the foot is removed from the treadle T, the friction-pulley $J'$ severs its connection with the cam-pulley J, the feeding mechanism of the vise is drawn out of gear by the withdrawal of the rod S, the vise is drawn forward and opened by turning the screw G, the vise raised by the lever F on the camway $E'$, allowing the pins or bolts $d^3$ to drop down and away from the vise-clamps $d$ and $d'$, allowing the vise-clamps $d$ and $d'$ to be opened, and the broom is taken out of the broom-holding vise.

What I claim as my invention, and desire to secure by Letters Patent, is—

1. In a broom-sewing machine, the combination of the broom-holding vise having attached to the jaws thereof the bosses $d^2$ $d^2$, in which bosses are placed the pins $d^3$ $d^3$, and attached to said jaws the vise-clamps $d$ and $d'$, the screw G, passing through the vise-carrying frame C and link $C^2$, and the lever F in contact with the sleeve $D^5$ and moving on a camway, $E'$, all substantially as described, and for the purpose set forth.

2. In a broom-sewing machine, a needle provided with the slot $h^3$ through the needle at the eye, and in which slot the tongue $h^2$ is movably secured, also with the slot $h^7$, into which the tongue $h^2$ passes when the eye is closed, all substantially as described, and for the purpose set forth.

3. In a broom-sewing machine, the combination of a broom-holding vise with a screw, G, the link $C^2$, the vise-carrying frame C, and the lever F, moving on a camway, $E'$, for raising and lowering the broom-holding vise, substantially as described, and for the purpose set forth.

4. In a broom-sewing machine, the combination of a broom-holding vise provided with two jaws, D D, the screw G, the link $C^2$, the curved track B, the vise-carrying frame C moving on said track, with the rack P, attached to the vise-carrying frame C, and the pinion $P'$, all substantially as described, and for the purpose set forth.

5. In a broom-sewing machine, the combination of the needle-arms $H'$ $H'$, attached to the head of the machine, each arm carrying one or more needles, H, provided with slots $h^3$ and $h^7$ through the eye of the needle, and a tongue, $h^2$, movably secured in the slot $h^3$, with a broom-holding vise provided with two jaws, D D, the screw G, the link $C^2$, the curved track B, vise-carrying frame C, moving on said track, and the lever F, moving on the camway $E'$, for raising and lowering the broom-holding vise, substantially as described, and for the purpose set forth.

6. In a broom-sewing machine, a threading and tension device composed of the threader M, having one or more openings for the passage of the needle or needles, the binders $M'$ and $M^2$, the cam-link O, connecting-rod $L'$, and lever L, all combined substantially as described, and for the purpose set forth.

7. In a broom-sewing machine, the combination of the needle-arms $H'$ $H'$, attached to the head of the machine, each arm carrying one or more needles provided with eye-slots $h^3$ and $h^7$, and tongue $h^2$, pivoted in the slot $h^3$ and passing into the slot $h^7$ when the needle-eye is closed, all combined substantially as described, and for the purpose set forth.

JOHN TEMPLE.

Witnesses:
SEYMOUR N. HARRIS,
WALTER E. WARD.